United States Patent [19]
Vitale et al.

[11] Patent Number: 6,066,408
[45] Date of Patent: May 23, 2000

[54] FUEL CELL COOLER-HUMIDIFIER PLATE

[75] Inventors: Nicholas G. Vitale, Albany; Daniel O. Jones, Glenville, both of N.Y.

[73] Assignee: Plug Power Inc., Latham, N.Y.

[21] Appl. No.: 08/911,358

[22] Filed: Aug. 7, 1997

[51] Int. Cl.[7] .............................. H01M 8/02; H01M 8/10
[52] U.S. Cl. ................................ 429/26; 429/34; 429/30; 429/38
[58] Field of Search ................................ 429/12, 13, 26, 429/34, 38, 39, 30

[56] References Cited

U.S. PATENT DOCUMENTS

| | | | |
|---|---|---|---|
| 4,476,199 | 10/1984 | Takeuchi et al. | 439/34 |
| 4,876,162 | 10/1989 | McElroy | 429/13 |
| 4,973,530 | 11/1990 | Vanderborgh et al. | 429/13 |
| 5,034,288 | 7/1991 | Bossel | 429/32 |
| 5,064,732 | 11/1991 | Meyer | 429/13 |
| 5,262,249 | 11/1993 | Beal et al. | 429/26 |
| 5,322,744 | 6/1994 | Koseki | 429/13 |
| 5,346,780 | 9/1994 | Suzuki | 429/42 |
| 5,366,818 | 11/1994 | Wilkinson et al. | 429/13 |
| 5,382,478 | 1/1995 | Chow et al. | 429/26 |
| 5,503,944 | 4/1996 | Meyer et al. | 429/13 |
| 5,534,363 | 7/1996 | Sprouse et al. | 429/34 |
| 5,776,624 | 7/1998 | Neutzler | 429/26 |
| 5,853,909 | 12/1998 | Reiser | 429/13 |
| 5,858,567 | 1/1999 | Spear, Jr. et al. | 429/12 |
| 5,858,569 | 1/1999 | Meacher et al. | 429/26 |

*Primary Examiner*—Maria Nuzzolillo
*Assistant Examiner*—Jonathan Crepeau
*Attorney, Agent, or Firm*—Heslin & Rothenberg, P.C.

[57] ABSTRACT

A cooler-humidifier plate for use in a proton exchange membrane (PEM) fuel cell stack assembly is provided. The cooler-humidifier plate combines functions of cooling and humidification within the fuel cell stack assembly, thereby providing a more compact structure, simpler manifolding, and reduced reject heat from the fuel cell. Coolant on the cooler side of the plate removes heat generated within the fuel cell assembly. Heat is also removed by the humidifier side of the plate for use in evaporating the humidification water. On the humidifier side of the plate, evaporating water humidifies reactant gas flowing over a moistened wick. After exiting the humidifier side of the plate, humidified reactant gas provides needed moisture to the proton exchange membranes used in the fuel cell stack assembly. The invention also provides a fuel cell plate that maximizes structural support within the fuel cell by ensuring that the ribs that form the boundaries of channels on one side of the plate have ends at locations that substantially correspond to the locations of ribs on the opposite side of the plate.

29 Claims, 8 Drawing Sheets

FUEL CELL COOLER-HUMIDIFIER PLATE

The Government of the United States of America has rights in this invention pursuant to Contract No. DE-AC02-94CE50389 awarded by the U.S. Department of Energy.

BACKGROUND OF THE INVENTION

This invention relates to fuel cells of the proton exchange membrane (PEM) type, also known as the polymer electrolyte membrane type. More particularly this invention relates to a novel means of integrating the means for cooling and humidification within a fuel cell stack assembly.

DESCRIPTION OF THE RELEVANT ART

A Proton Exchange Membrane (PEM) fuel cell converts the chemical energy of a fuel, such as hydrogen, directly into electrical energy. PEM fuel cells offer many advantages over conventional means of generating electrical energy: they operate at relatively low temperatures and therefore require little or no warmup time; they are clean (their exhaust is typically water and air), they are quiet, they are efficient, and the typical source of fuel—hydrogen—is in abundant supply. Nevertheless, due to difficulties and costs in manufacturing, PEM fuel cells have not yet achieved their potential as replacements for conventional means of generating electrical energy. The instant invention enhances the efficiency of fuel cells by optimizing the use of exhaust heat created by the fuel cell reaction itself in humidifying the reactant gases of the fuel cell.

Figure 1:
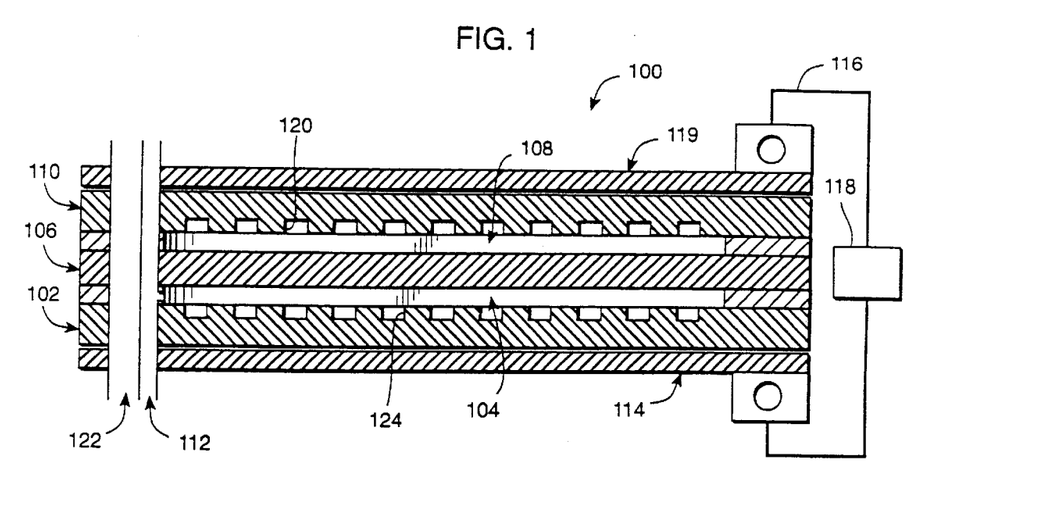
FIG. 1 shows a typical PEM fuel cell.

The centerpiece of a typical PEM-type fuel cell is a solid polymer electrolyte—the PEM—that permits the passage of protons from the anode side of the cell to the cathode side, while preventing the passage of gases that provide the chemical fuel for the cells. FIG. 1 depicts a typical PEM-type fuel cell. A reaction on the anode side of the PEM produces protons ($H^+$) and electrons. The protons pass through the membrane to the cathode side, and the electrons also travel to the cathode side of the membrane, but through an external electrical conductor. On the cathode side, the protons and electrons react with oxygen gas to produce water. The external electron flow from the anode to the cathode is the electrical energy created by the fuel cell reaction that can be used to supply electricity to a load.

More specifically, as depicted in FIG. 1, the PEM fuel cell 100 comprises an anode-side fluid flow plate 102 for the flow of hydrogen, an anode area 104, a proton exchange membrane 106, a cathode area 108, and a cathode-side fluid flow plate 110 for the flow of oxygen or air containing oxygen. Hydrogen gas introduced from a hydrogen manifold 112 at the anode-side fluid flow plate 102 travels along a fluid flow channel 124 in the anode-side flow plate 102, and also diffuses in a direction perpendicular to the flow channel toward the anode area 104. In the anode area 104, the hydrogen gas is oxidized to form hydrogen nuclei ($H^+$ ions or protons) and electrons. The $H^+$ ions travel through the proton exchange membrane 106 to the cathode area 108, but the hydrogen gas itself does not penetrate the proton exchange membrane 106.

The electrons formed by the above-mentioned reaction are conducted from the anode area 104 to the anode-side flow plate 102, to anode-side current collector plate 114. Electrons flow from the anode-side current collector plate 114 through an external electrical conductor 116 to a load 118, and from the load 118 to cathode-side current collector plate 119 at the cathode side of the fuel cell.

At the cathode side, oxygen gas, either in pure form or as a component of air, is introduced to a channel 120 on a cathode-side fluid flow plate 110 from an oxygen manifold 122. The oxygen reacts with the protons ($H^+$) coming through the membrane 106 as described above and the electrons coming from the external conductor as also described above, to form water.

In the PEM cell, the two chemical reactions are:

$H_2 \rightarrow 2H^+ + 2\ e^-$ (anode side), and $O_2 + 4H^+ + 4\ e^- \rightarrow 2H_2O$ (cathode side).

A catalyst, typically platinum, is used on both the anode and the cathode side to facilitate the reactions.

Each fuel cell typically delivers a relatively small voltage, on the order of about 0.4 to about 0.9 volts. In order to achieve higher voltage, fuel cells are typically connected in series, as a fuel cell stack assembly. In order to minimize the size of the fuel cell stack, bipolar fuel cell plates having an anode side and a cathode side are typically used. In a fuel cell stack using bipolar plates, the anode and cathode sides of a bipolar plate serve, respectively, as the anode and cathode of adjacent fuel cells.

The present invention simultaneously addresses two essential features of fuel cell design by providing cooling to remove excess heat from the fuel cell stack to prevent the stack from overheating, and by humidifying the reactant gases to provide the moisture necessary to maintain the proton exchange membrane in a conducting state, and to prevent the proton exchange membrane from drying out which can lead to cracking of the PEM anode surface and possible cell failure.

The chemical reactions that result in the production of electrical energy in a PEM-type fuel cell are exothermic, that is, they give off heat. Accordingly, fuel cell design must address the need to avoid heat build-up by removing heat from the cells. Heat buildup is particularly acute in fuel cells toward the middle of a stack, which are the greatest distance from ambient air. The reactant gases alone provide insufficient heat removal to prevent increases in temperature that could potentially result in a loss of power output and damage to the cell. In particular, the proton exchange membrane may undergo chemical change and suffer loss of performance if operated at temperatures greater than approximately 115–120° C. Hence, it is necessary to provide means for cooling the fuel cell stack. Prior art fuel cells employ various means for cooling the cells. For example, some fuel cell stack designs employ "cooler" plates that are positioned at various locations in the stack in order to provide needed cooling of the assembly. Others claim that the oxygen reactant can be used for successfully removing waste heat.

Keeping the membrane moist is also essential to proper fuel cell operation. The typical membrane is an ionomer, such as NAFION® 117, produced by DuPont, or Dow Chemical Company's XUS 13204.10. If the membrane is allowed to dry out, it will not conduct protons. In addition, membrane dryout can lead to cracking of the PEM surface and possible cell failure. The danger of membrane dryout is particularly acute on the anode side, since the fuel cell reaction on the anode side does not create water, in contrast to the reaction on the cathode side.

Prior art fuel cells employ various means for ensuring that the proton exchange membrane is kept moist. Some prior art fuel cell stack designs provide for humidification of the reactant gases—especially the anode-side hydrogen gas fuel—so that the humidified gas serves to keep the membrane hydrated. Typical prior art means for humidifying the reactant gases include fuel cell stack designs that employ a humidification section comprising a set of humidifier plates located in a section of the fuel cell stack assembly. In such designs, the unhumidified reactant gas is channeled through this section of the fuel cell stack prior to entering the active area of the fuel cell stack to generate power. The humidifier plates employ a moistened membrane to impart moisture to the gas streams. Because the membrane is not electrically conductive, plates employing this method are typically located at the ends of fuel cell stack assemblies. As a result, means for transporting the gas to the humidification section, and from there to the fuel cells in the stack, can be quite complicated. In addition, the use of the membrane for humidification purposes adds significantly to the overall cost of the fuel cell. Examples of this sort of humidification section are those described and claimed in Chow et al., U.S. Pat. No. 5,382,478.

Another method of keeping the anode side of the PEM moist is to maintain a pressure differential between the cathode side of one cell and the anode side of an adjacent cell, as taught by Meyer, U.S. Pat. No. 5,064,732. In Meyer, a porous element is positioned between the cathode side of one cell and the anode side of an adjacent cell, and the cathode side is maintained at a higher pressure so that water tends to flow through the porous element from the cathode side to the anode side. As with other prior art methods, Meyer requires the use of additional equipment, such as pumps, valves and compressors, that tend to decrease the reliability and increase the complexity and cost of the fuel cell system.

Another prior art system, described in Sprouse, et al., U.S. Pat. No. 5,534,363 involves the use of a wick to establish direct contact between the anode surface of the PEM and a water reservoir. Although Sprouse provides a specialized "wagon wheel" design to maximize access of hydrogen gas to the anode of the fuel cell, use of the wick—which is positioned against the anode side of the PEM—necessarily reduces the surface area on the anode side of the fuel cell that may be contacted by hydrogen gas, and therefore reduces the number of reactions that occur, and ultimately reduces the power output of the cell.

Other systems designed to keep the PEM hydrated may employ external means of humidifying the reactant gases, so that the humidified reactant gases carry the necessary moisture to the membrane. For example, in some systems, humidification water is heated outside of the fuel cell assembly by exhaust heat from the fuel cell itself, and the reactant gas is then exposed to this heated water, thereby humidifying the gas. Under these circumstances, however, due to heat transfer losses, the gas is not heated to the temperature of the fuel cells. The gas thus picks up less water than it would if its temperature had been equal to the cell temperature, and thus serves its humidification purpose less satisfactorily. In addition in systems where the humidification function is performed outside the active area of the fuel cell stack more complex flow manifolding is required than would be required if the gas humidification function could be performed in the active area of the stack.

SUMMARY OF THE INVENTION

An object of the invention is to provide a reliable method for keeping a fuel cell membrane adequately hydrated.

Another object of the invention is to provide a fuel cell gas humidification system with a high degree of flexibility and increased functionalities over conventional fuel cell humidification systems.

Another object of the invention is to provide a fuel cell stack assembly in which the humidification function is integrated with the cooling function.

A further object of the invention is to provide a humidification system for a fuel cell that humidifies fuel cell reactant gas within the fuel cell stack using humidification heat obtained from coolant that is serving a cooling function within the fuel cell stack.

Another object of the invention is to provide an integrated cooler-humidifier plate for a fuel cell stack that reduces reject heat from the fuel cell system.

Another object of the invention is to provide a method for maximizing structural support of a fuel cell assembly by minimizing stress points in a fluid flow plate having flow channels on opposite faces of the plate.

Another object of the invention is to provide a method for maximizing structural support of a fuel cell assembly by minimizing stress points throughout a fuel cell assembly.

A further object of the invention is to provide a humidification system for a fuel cell assembly that maximizes the amount of water that the humidified gases are able to entrain.

Another object of the invention is to provide a humidification system with a simplified flow manifolding system for reactant gases.

A further object of the invention is to provide, in a fuel cell assembly, electrically conductive cooler-humidifier plates, thereby allowing the humidification function to occur in the active area of a fuel cell stack assembly.

The present invention, as broadly described herein, provides a fuel cell assembly cooler-humidifier plate comprising a cooler surface forming at least one coolant flow channel, a gas humidification surface forming at least one gas humidification flow channel, and means for humidifying a gas flowing in the gas humidification flow channel. The cooler-humidifier plate is positioned in an active area of the fuel cell stack assembly such that the cooler side of the plate removes heat from the fuel cell assembly, and supplies heat to the humidifier side of the plate in order to evaporate humidification fluid used to humidify a reactant gas.

The present invention, as broadly described herein, also provides a novel means for humidifying a reactant gas in a fuel cell assembly, comprising a humidification flow channel with a hydrophilic wick. In this embodiment, reactant gas flowing over the water-moistened wick becomes humidified and can then be used to provide necessary moisture to the proton exchange membrane of a fuel cell. In a preferred embodiment, the plate forming the humidifier channel is electrically conductive, and as such can be positioned in an active area of the fuel cell stack.

The present invention also provides a fuel cell plate comprising a first major surface comprising a plurality of ribs that form at least one flow channel, a second major surface comprising a plurality of ribs that form at least one flow channel, and wherein the location of each rib on the first surface substantially corresponds to the location of a rib on the second major surface.

As broadly described herein, the present invention also provides a fuel cell plate comprising a first major surface comprising a plurality of ribs that form at least one flow channel, each first major surface rib having at least one end; a second major surface comprising a plurality of ribs that form at least one flow channel, each second major surface rib having at least one end; wherein the location of the end of each first-major-surface rib in the plane of the fuel cell plate substantially corresponds with the location of a portion of a second-major-surface rib in that plane, and wherein the location of the end of each second-major-surface rib in the plane of the fuel cell plate substantially corresponds with the location of a portion of a first-major-surface rib.

The present invention also provides a novel means of ensuring adequate structural support in a fuel cell stack assembly by minimizing stress points and providing a continuous load path through the ribs formed by each plate used in a fuel cell assembly. Specifically, the invention provides a fuel cell stack assembly comprising a plurality of adjacent plates comprising at least one bipolar fuel cell plate forming a plurality of bipolar-plate ribs; at least one monopolar fuel cell plate forming a plurality of monopolar-plate ribs; and a cooler-humidifier fuel cell plate forming a plurality of cooler-humidifier plate ribs having rib ends; wherein the locations of the rib ends formed by each plate within the stack substantially correspond with the locations of ribs on the immediately adjacent plate.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

FIGS. 2A, 2B and 2C are exploded views, taken from different perspectives, of a fuel cell assembly including a cooler-humidifier plate of the present invention.

DETAILED DESCRIPTION OF THE PREFERRED EMBODIMENTS

Reference will now be made in detail to the present preferred embodiment of the invention, examples of which are illustrated in the accompanying drawings, wherein like reference numerals indicate like elements throughout the several views.

The cooler-humidifier plate of the present invention comprises a first major surface forming at least one coolant flow channel, a second major surface forming at least one humidification flow channel, and means for humidifying a gas flowing in the at least one humidification flow channel. The invention includes a cooler-humidifier plate for humidifying cathode-side gas (typically air or oxygen), as well as a cooler-humidifier plate for humidifying anode-side gas (typically hydrogen). In the preferred embodiment depicted in FIGS. 2A–2C as cooler-humidifier plate 202, the first major surface is cooler surface 203, the coolant flow channel is coolant channel 206, the second major surface is humidifier surface 214, and the humidification flow channel is humidifier channel 218. As depicted in FIG. 3, the means for humidifying the gas in humidification flow channel 218 is wick 308.

Figure 2A:
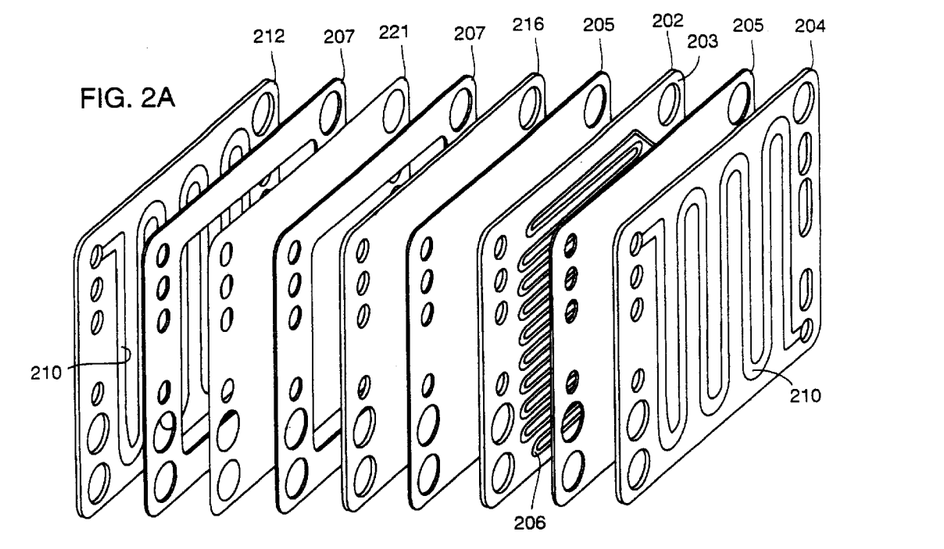
Figure 2B:
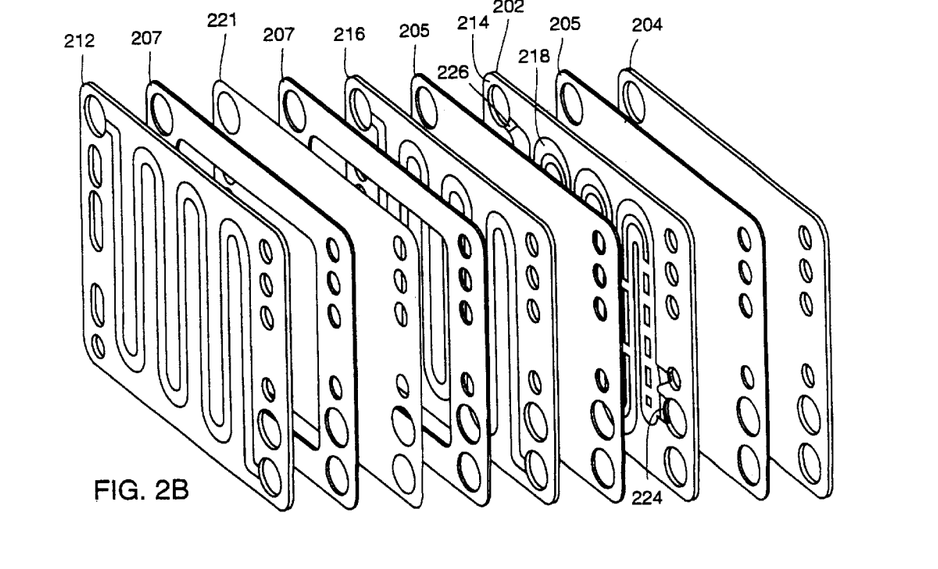
Figure 3:
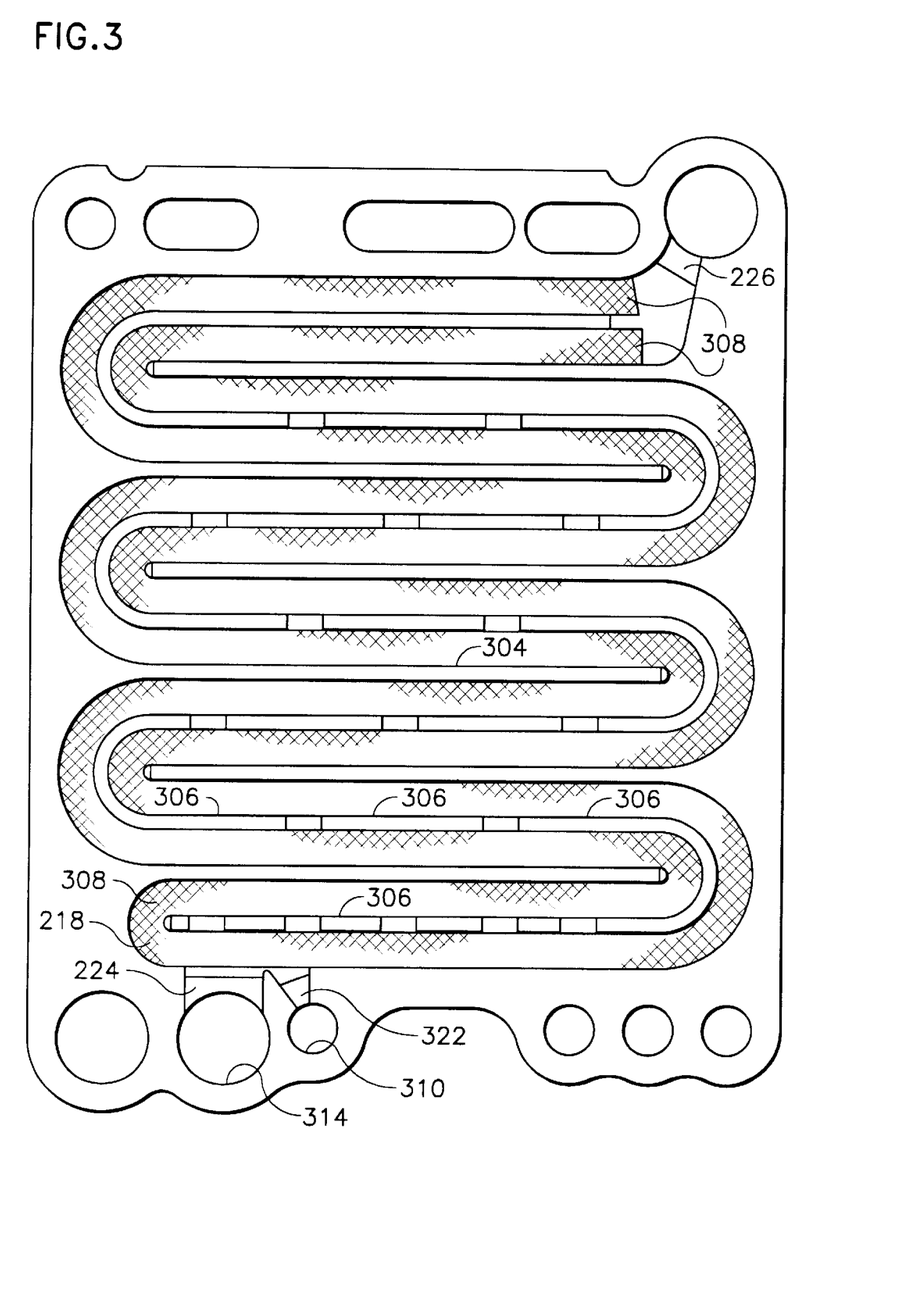
FIG. 3 shows the humidifier face of a cooler-humidifier plate of the present invention.

FIGS. 2A and 2B depict, from two different perspectives, a preferred embodiment of the cooler-humidifier plate 202, as it appears for use in a fuel cell stack assembly. As depicted in FIG. 2A, the cooler side 203 of cooler-humidifier plate 202 is separated from the back side of monopolar anode fuel cell plate 204 only by an electrically conductive sealing gasket 205. In operation, gasket 205 and the back side of monopolar fuel cell plate 204 serve to close the open-face flow channels 206 on the cooler side 203 of cooler-humidifier plate 202. Coolant, preferably water, traveling through flow channels 206 therefore serves to remove heat from monopolar fuel cell plate 204 and transfer heat as needed to the humidifier on the opposite side of the plate. As depicted in FIGS. 2A and 2B, proton exchange membrane 221, with a picture-frame gasket 207 on either side, is disposed between the cathode side of monopolar cathode plate 216 and the anode side of bipolar plate 212.

In the preferred embodiment depicted in FIG. 2A, the flow channels 206 on the cooler side of the cooler-humidifier plate are substantially perpendicular to the flow channels 218 on the humidifier side 214 of the plate (as depicted in FIG. 2B), and also to the flow channels 210 on the monopolar plates 204 and 216 and bipolar plates 212 in the fuel cell stack. As discussed at greater length in connection with FIG. 7, the purpose of this alignment is to minimize the stress points in the fuel cell assembly, by permitting the mechanical load of the assembly to be distributed through the ribs formed by each of the adjacent plates in the fuel cell stack assembly.

Because the cooler-humidifier plate 202 conducts heat from its cooler side 203 to its humidifier side 214, cooler-humidifier plate 202 is made of a thin material with high thermal conductivity. In a preferred embodiment, the cooler-humidifier plate 202 is made of metal, most preferably Austenitic Stainless Steel. In other preferred embodiments, cooler-humidifier plate 202 can be made of titanium or graphite.

Figure 2C:
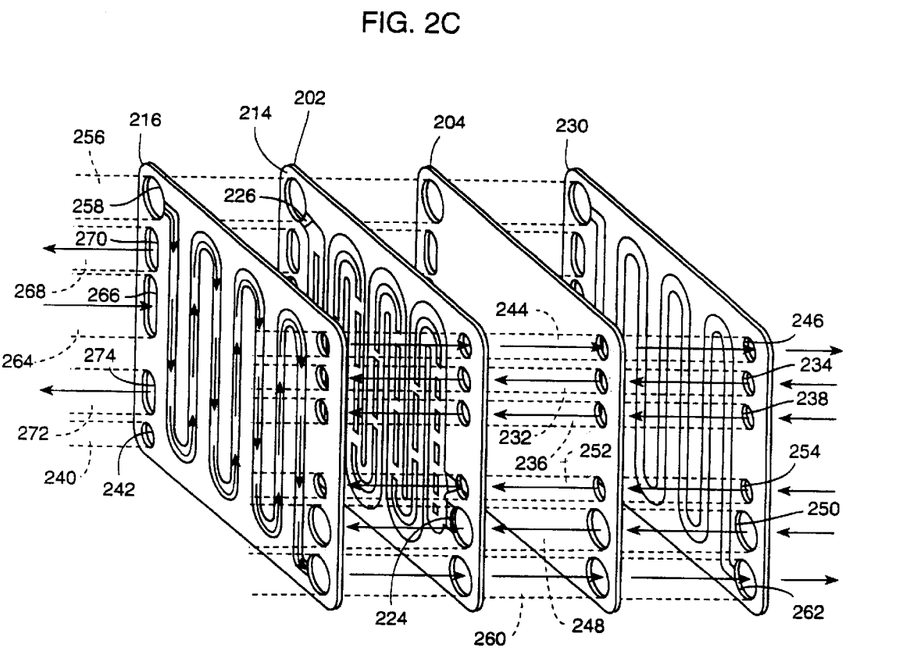
FIG. 2C shows the flow manifolding of a fuel cell assembly of a preferred embodiment of the present invention.

In the preferred embodiment depicted in FIGS. 2A–2C, the humidifier side 214 of cooler-humidifier plate 202 is a cathode gas humidifier. As depicted in FIGS. 2A–2C, the humidifier side 214 of cooler-humidifier plate 202 is separated from the back side of monopolar cathode fuel cell plate 216 only by an electrically conductive sealing gasket 205. In operation, gasket 205 and the back side of monopolar fuel cell plate 216 serve to close the open-face flow channels 218 on the humidifier side 214 of cooler-humidifier plate 202. As indicated above, the open-face flow channels 218 are oriented in the same direction as the flow channels of the monopolar plates 204 and 216 and bipolar plate 212, and substantially perpendicular to the flow channels of the cooler side 203 of cooler-humidifier plate 202.

The desired uniformity of plate temperatures within the fuel cell stack dictates the number of fuel cells placed between cooler-humidifier plates. For fuel cells operating at high power density (at power levels in excess of approximately 0.4 watts per square centimeter (0.4 W/cm$^2$) of cell active area), stack axial temperature variations less than approximately 8° C. can typically be achieved by providing one cooler-humidifier plate for every four fuel cells in the fuel cell assembly. In a preferred embodiment, therefore, a fuel cell stack assembly comprises a plurality of four-fuel-cell modules, each module comprising one cooler-humidifier plate, two monopolar plates (one anode, one cathode), and three bipolar plates. In a preferred embodiment of a fuel cell stack assembly, the ratio of the number of cathode humidifiers to anode humidifiers in the stack is set by the fuel cell stack's humidification requirements and operating conditions. Due to the larger air mass flow-rate for the cathode, the ratio of cathode humidifiers to anode humidifiers is typically between 2:1 and 3:1. This ratio, combined with the number of cells per cooler, sets the number of cells each humidifier must serve and the gas and water inputs to each humidifier.

In a preferred embodiment depicted in FIG. 2C, fluid inlet and outlet manifolds are formed by aligning holes in the various fuel cell plates. Thus, anode gas humidification inlet manifold 232 is formed by holes 234; anode humidification water inlet manifold 236 is formed by holes 238; humidified anode gas manifold 240 is formed by holes 242; anode gas exhaust manifold 244 is formed by holes 246; cathode gas humidification inlet manifold 248 is formed by holes 250; cathode humidification water inlet manifold 252 is formed by holes 254; humidified cathode gas manifold 256 is formed by holes 258; cathode gas exhaust manifold 260 is formed by holes 262; coolant water inlet manifold 264 is formed by holes 266; and coolant water outlet manifolds 268 and 272 are formed, respectively, by holes 270 and 274.

As depicted in FIG. 2C, cathode gas humidification inlet manifold 248 supplies cool, dry air or oxygen gas for humidification to the humidifier side 214 of cooler-humidifier plate 202 through gas humidification inlet bridgepiece passage 224. Humidification water is supplied by cathode humidification water inlet manifold 252. The humidified air exits the humidifier side 214 through gas outlet bridgepiece passage 226 to humidified cathode gas manifold 256, which supplies humidified air to cathode monopolar plate 216 and the cathode side of bipolar plate 230. Cathode exhaust gas is collected in cathode exhaust manifold 260.

As shown in FIGS. 2B and 2C, gas humidification inlet bridgepiece passage 224 and gas outlet bridgepiece passage 226 provide effective sealed connections between humidification flow channel 218 and cathode gas humidification inlet manifold 248 and humidified cathode gas outlet manifold 256, respectively, and prevent gas from avoiding the humidifier by flowing between gasket 205 and monopolar cathode plate 216. The technology used for making and utilizing these gas passages is described more fully in U.S. patent application Ser. No. 08/839,667, now U.S. Pat. No. 6,017,648, the specification of which is fully incorporated herein by reference.

The humidifier face of a cooler-humidifier plate of the present invention can form a single flow channel or a plurality of flow channels. FIG. 3 depicts a preferred embodiment of the humidifier face of a cooler-humidifier plate of the present invention including humidification flow channel 218, lands 304, island lands 306, wick 308, humidification water inlet 310 and bridgepiece passage 224, gas inlet 314 and bridgepiece passage 226.

In the preferred embodiment depicted in FIG. 3, humidification flow channel 218 consists of a single flow channel with a relatively wide base, to accommodate a relatively wide wick 308. In a preferred embodiment, the width of the channel is approximately 0.1 to 1 inch. In a preferred embodiment, channel runs are separated by island or broken lands, so that gas can flow from one channel run to the adjacent channel run without necessarily running the full course of the channel. In alternative proposed embodiments, a plurality of flow channels are used. In yet another preferred embodiment, the channelling means comprises a series of parallel channels, all interconnected in a crosswise configuration.

Wick 308 serves to provide humidification water to the reactant gas. For a single-channel humidifier plate with channels containing broken or island lands such as that depicted in FIG. 3, the wick may be a unitary piece of wicking material forming holes such that the wicking material lies in the channel and the holes accommodate the broken or island lands. Alternatively, multiple wicks can be used, even for a single-channel humidifier plate. In a preferred embodiment, wick 308 is fabricated from a cellulosic material specially designed to maximize the exposed surface area of the wick 308 while lying flat in humidification flow channel 302. A suitable material is #4112-39-2, a material developed for this application by Albany International Research Co., Mansfield, Mass. In a preferred embodiment, the thickness of the wicking material is held to a minimum, approximately 1–2 mm, and may be even further reduced by hot-pressing. Minimizing the thickness of wick 308 in turn minimizes the humidifier volume, and therefore allows a thinner plate to be used. In a preferred embodiment, wick 308 is adhered to the base of the flow channel using epoxy. In alternative preferred embodiments the humidifier plate comprises means, such as retaining clips or clamps, for maintaining the wick at the base of the channel. In still other preferred embodiments, the wick is adhered to the base of channel using a pressure sensitive adhesive, such as transfer tape, or a hot melt adhesive.

In a preferred embodiment, wick 308 is located in the bottom of humidification flow channel 302. This results in maximum heating of the water that is supplied to the wick, because the plate is thinnest, and therefore hottest, at the base of the humidification flow channel 302.

In the preferred embodiment depicted in FIG. 3, humidification water is supplied to wick 308 through humidification water inlet 310 and humidification water flow passage 322. Humidification water flow passage 322 is depicted as a bridgepiece passage, but may be an angle-drilled hole, or a porous restrictor. The humidification water initially moistens the wick at the entrance to the flow channel, and water runoff is carried by the flowing gas along the channel, moistening the wick as it goes. In steady state operation, the wick remains saturated throughout its length, and the humidification water entering the flow channel becomes runoff that may also be entrained by the cool dry gas entering the flow channel.

In a preferred embodiment depicted in FIG. 3, reactant gas enters the plate from the humidification inlet manifold hole 314, which is located at the periphery of the plate. The humidification inlet manifold supplies gas through bridgepiece passage 224 to humidification flow channel 218. The size of the humidifier gas flow channel 218 reflects a compromise, known to one of ordinary skill in the art, between the good heat transfer obtained from high fluid velocity that results from a narrow channel, and the minimal pressure drop that occurs in a wide channel where fluid velocity is low. As the gas traverses the humidification flow channel, its temperature rises as a result of heat transfer from the coolant across the cooler-humidifier plate, and its capacity to pick up additional water therefore also rises; hence the need for wicking material throughout the flow channel. In the preferred embodiment depicted in FIG. 3, gas at the outlet of the channel is preferably at or about the temperature of the fuel cells, and has approximately 85–100% relative humidity.

Figure 4:
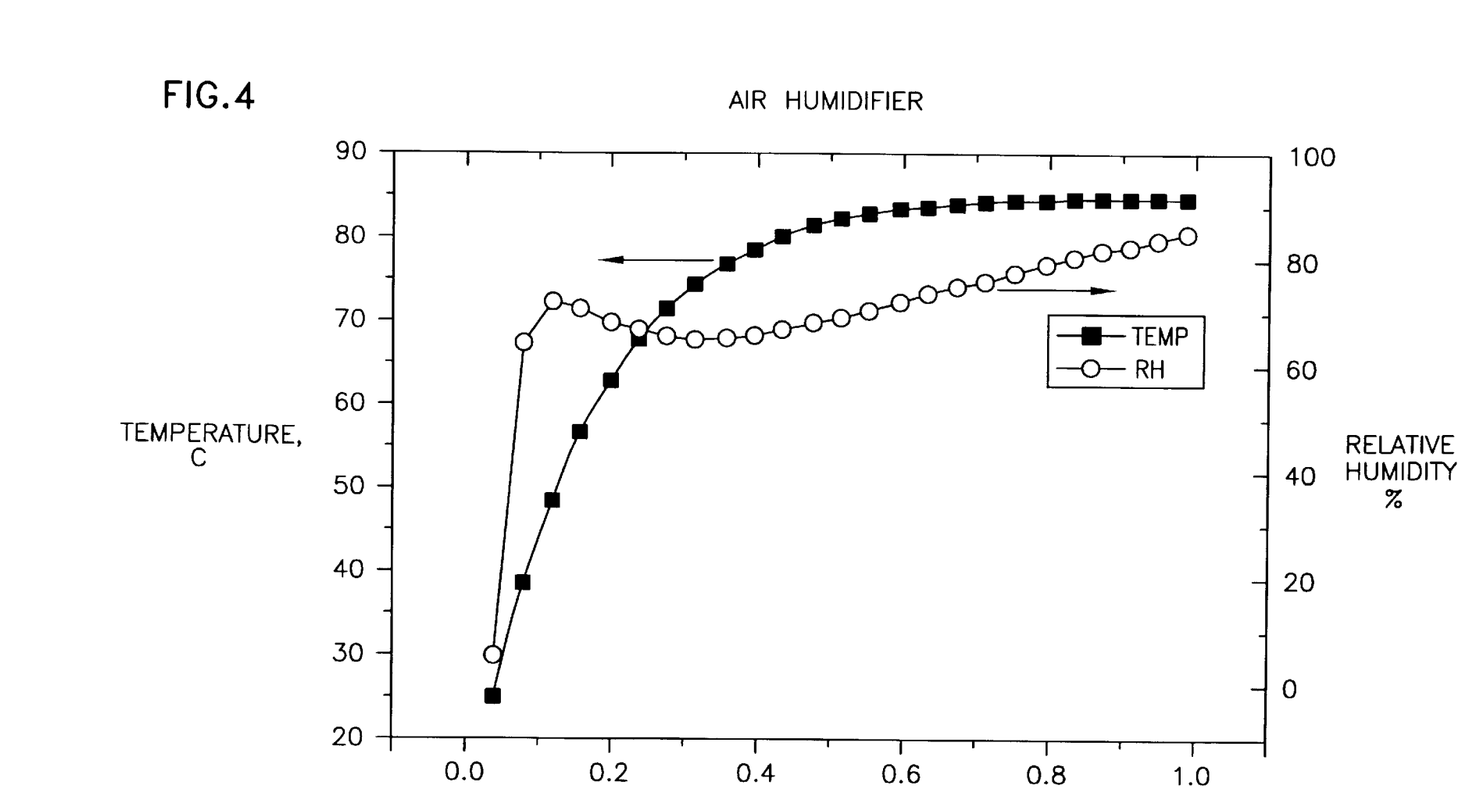
FIG. 4 shows calculated variations of gas temperature and relative humidity along the humidifier flow passage length for a cathode (air) humidifier.
Figure 5:
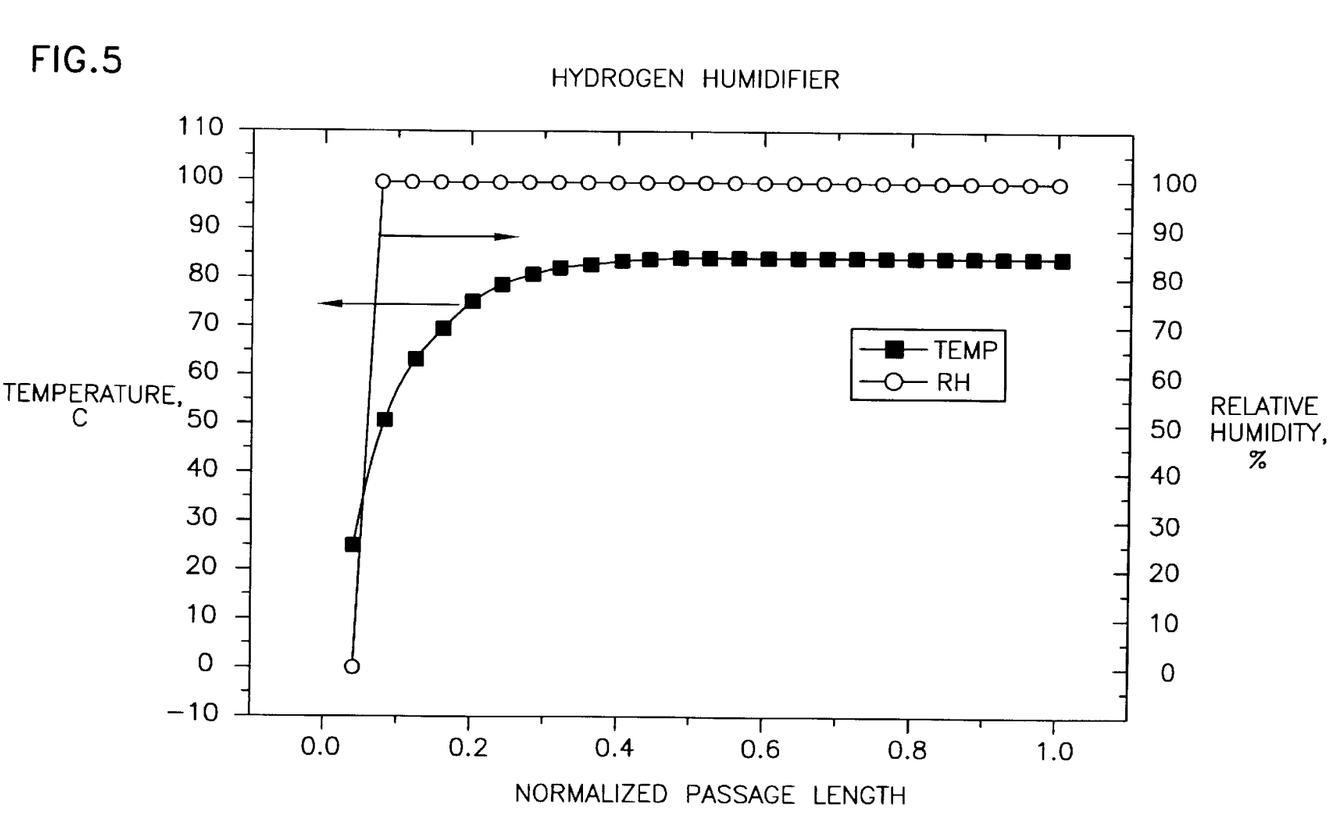
FIG. 5 shows calculated variations of gas temperature and relative humidity along the humidifier flow passage length for an anode (hydrogen) humidifier.

FIGS. 4 and 5 show calculated variations of gas temperature and relative humidity along the humidifier flow passage length for cathode and anode humidifiers, respectively. The calculations are based on a stack, constructed in accordance with a preferred embodiment of this invention, with cells of 250 $cm^2$ active area operating at 0.8 Amps/$cm^2$ current density, 3 atm pressure and 85° C. temperature, with 5.8 cells per cathode humidifier and 13 cells per anode humidifier. The calculations assume that cathode humidifiers have 49.4 g/min air and 6.3 g/min water, and anode humidifiers have 2.5 g/min hydrogen and 5.1 g/min water.

As can be seen from FIG. 5, the anode (hydrogen) humidifier has a high effectiveness. Hydrogen is heated to the plate temperature and has 100% relative humidity (RH) when it has traversed only approximately 30% of the flow passage. As shown in FIG. 4, air exits the cathode humidifier fully heated at 85% RH.

In a preferred embodiment, water used for humidification is captured from the reactant gas exhaust streams in knock-out drums and recycled, thereby avoiding the need for an external source of humidification water. In this preferred embodiment, an external water management system, such as is known in the art, provides the proper water delivery to the humidifiers, with excess water drained overboard. In a preferred embodiment, humidification water is deionized to minimize the potential transport of ions into the fuel cell that could interfere with the fuel cell reactions.

Figure 6:
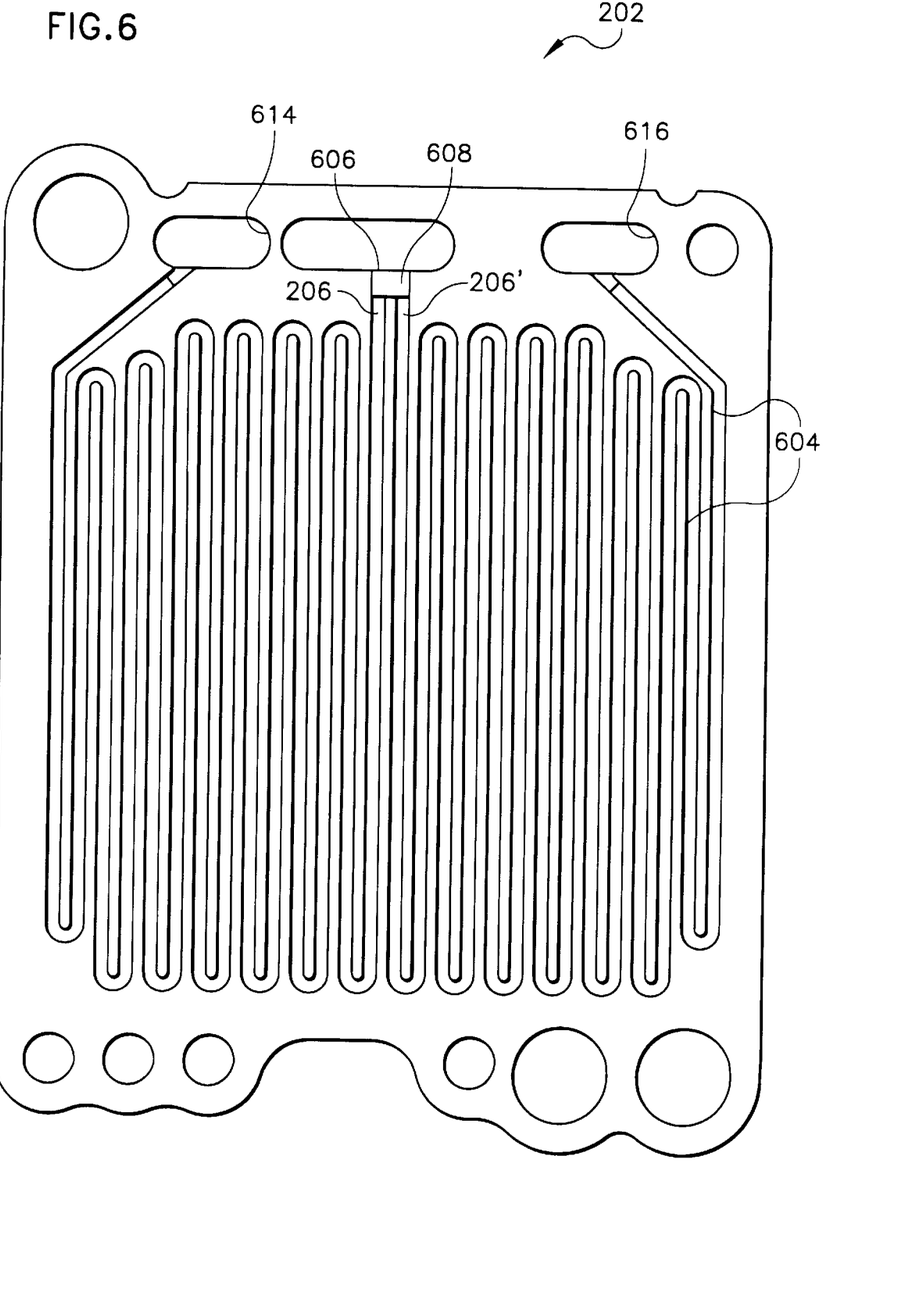
FIG. 6 shows the cooler face of a cooler-humidifier plate of the present invention.

FIG. 6 depicts a preferred embodiment of the cooler side of a cooler-humidifier plate 202 of the present invention including coolant flow channels 206 and 206', lands 604, coolant water inlet 606, inlet bridgepiece passage 608, and coolant water outlets 614 and 616.

In the preferred embodiment depicted in FIG. 6, flow channels 206 and 206' are relatively narrow flow channels that have inlets adjacent to each other, near the midpoint of a side of the cooler-humidifier plate 202. In the preferred embodiment, flow channels 206 and 206' are parallel, where successive channel passes of flow channel 206 proceed in one direction down the face of cooler-humidifier plate 202, and successive channel passes of flow channel 206' proceed up the face of the cooler-humidifier plate 202 in the opposite direction. In this preferred embodiment, the dual channels emanating from the center of the cooler-humidifier plate provide the maximum cooling to the central region of the fuel cell, where temperatures are highest. In particular, the design provides more cooling flow at colder temperatures to the central region of the fuel cell. In a preferred embodiment, the cooling water flow-rate is typically adjusted to maintain a temperature rise of less than 7° C. between stack inlet and exit. The heat load imposed by the water evaporation in the humidifier is largest at the humidifier entrance region. As can be seen from an examination of FIGS. 3 and 6, coolant at a location on the cooler-side of the plate corresponding to the location of the humidifier entrance is approximately half-way between inlet and exit in these areas, and therefore has picked up considerable heat from the central plate region. The coolant thus transfers this heat to the high-heat-load area of the humidifier entrance region to minimize local temperature depression there.

Figure 7:
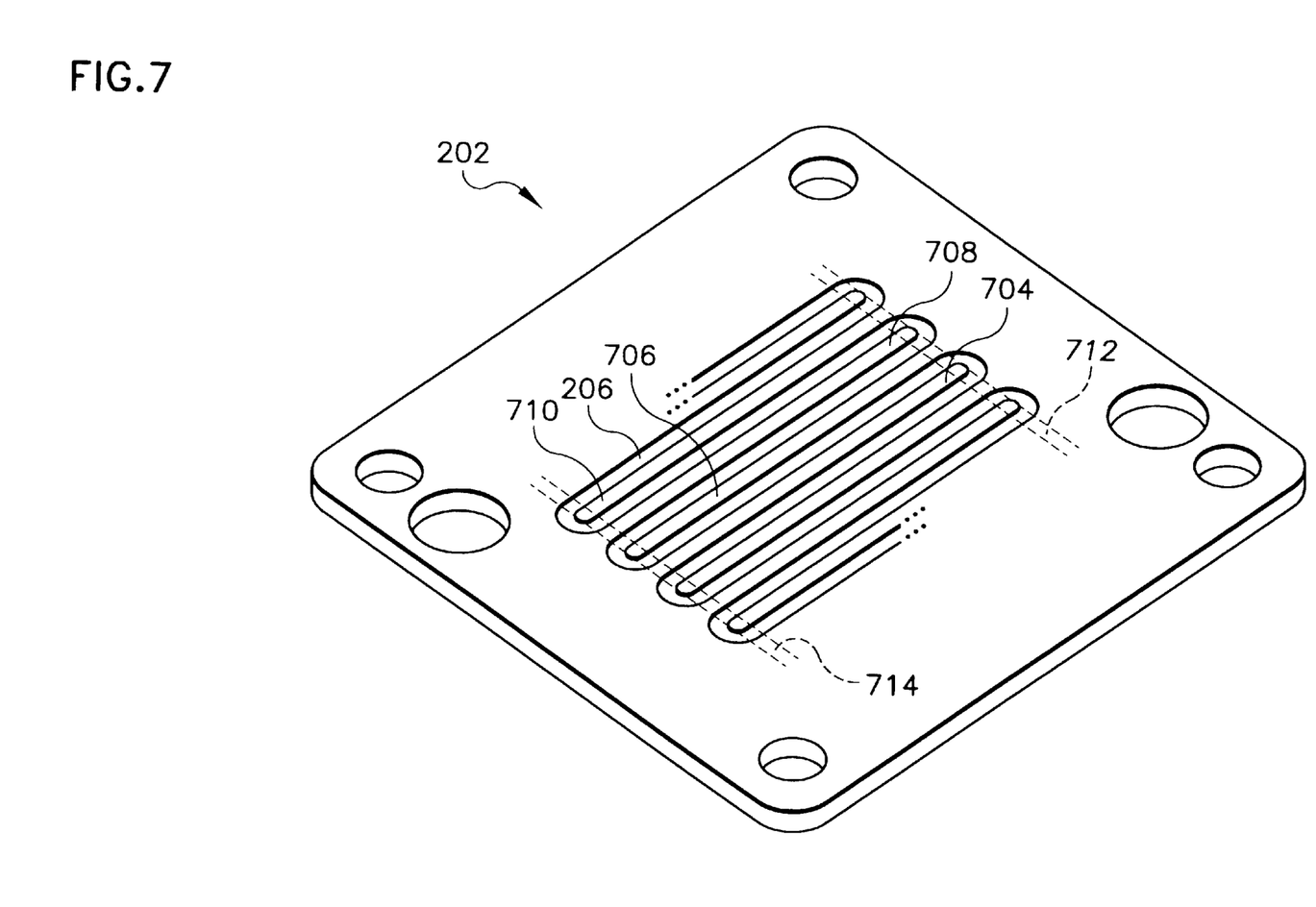
FIG. 7 illustrates the stress reduction feature of a fuel cell cooler-humidifier plate of the present invention.

FIG. 7 illustrates the stress reduction feature of a fuel cell cooler-humidifier plate of the present invention. To maximize fuel cell efficiency, fuel cell plates are typically clamped together under substantial pressure. It is also desirable to maintain cooler-humidifier plates as thin as possible to maximize thermal conductivity. It is therefore important to minimize structural stresses that may occur as a result of the design of the flow channels on each side of the plate. It has been found, for example, that where the ends of ribs on one side of a fuel cell plate occur at a location that does not correspond to the location of a rib or other load bearing formation on the other side of the plate, a stress point occurs that can lead to cracking, buckling, or other structural deformation of the plate, which in turn may lead to corrosion. For example, if the end of a rib on the cooler side of the plate corresponded to a location of the middle of a channel on the humidifier side of the plate, the plate would be subject to undesirable stresses. This is a particular problem where the humidifier channels are relatively wide. Thus, in the case of wide humidification channels and narrow cooling channels, a design with flow channels running in parallel directions on each side of the plate would result in some of the ribs of the cooling channels having no support on the humidifier side of the plate.

In a preferred embodiment, the cooler-humidifier plate is manufactured such that, to the maximum extent feasible, the end of each rib on one side of the plate corresponds with the location of a rib on the other side of the plate, and vice versa. In a preferred embodiment, the same general principle is applied not only to the cooler-humidifier plate itself, but to all plates in a fuel cell stack. For example, in a preferred embodiment, the rib ends of each plate in a fuel cell stack substantially correspond with ribs on the immediately adjacent plate or plates. This can be accomplished for bipolar fuel cell plates and monopolar fuel cell plates by providing substantially identical flow channels on all such plates, such that the ribs are fully supportive of one another from plate to plate. In other words, the flow channels on each side of a bipolar plate can substantially exactly correspond to one another, and can also correspond substantially exactly with the flow channels on the monopolar plates within the stack.

In such a case, a cooler-humidifier plate of the present invention can easily be incorporated into the fuel cell stack assembly provided the same principle is followed: that for each side of the cooler-humidifier plate, the rib ends correspond to the locations of ribs on the adjacent monopolar plate. This principle is illustrated in FIG. 7, which depicts the coolant side of a cooler-humidifier plate 202 having a single coolant flow channel 206, where adjacent passes of coolant flow channel 206 are separated by ribs 704, 706, 708, and 710. As depicted in FIG. 7, stress can be reduced by ensuring that the locations of the ends of ribs 704, 706, 708 and 710 correspond to the locations of ribs 712 and 714 on the humidifier side of the plate (illustrated by dashed lines). By ensuring that the ribs and rib ends line up as described, the pressure of the stack assembly can be substantially distributed to the multiplicity of ribs of the several plates making up the assembly.

It will be apparent to those skilled in the art that various modifications can be made to this invention of a fuel cell assembly cooler-humidifier plate without departing from the scope or spirit of the invention. It is also intended that the present invention cover modifications and variations of the cooler-humidifier plate within the scope of the appended claims and their equivalents.

We claim:

1. A fuel cell assembly non-porous cooler-humidifier plate comprising:

a first major surface forming at least one coolant flow channel;

a second major surface forming at least one humidification flow channel; and means for humidifying a gas flowing in the at least one humidification flow channel.

2. The cooler-humidifier plate of claim 1, wherein the humidifying means comprises:

means for introducing gas into the at least one humidification flow channel; and means for transporting water along the length of the at least one humidification flow channel.

3. The cooler-humidifier plate of claim 2, wherein the at least one humidification flow channel follows a serpentine traversing path.

4. The cooler-humidifier plate of claim 2, wherein the width of the at least one humidification flow channel is about 0.1 inches to about 1 inch.

5. The cooler-humidifier plate of claim 2, wherein the water transporting means comprises a wick.

6. The cooler-humidifier plate of claim 5, wherein the wick comprises a cellulosic material.

7. The cooler-humidifier plate of claim 5, further comprising means for adhering the wick to the bottom of the at least one humidification flow channel.

8. The cooler-humidifier plate of claim 7, wherein the means for adhering the wick to the bottom of the at least one humidification flow channel comprises an epoxy glue.

9. The cooler-humidifier plate of claim 5, wherein the second major surface forms a plurality of adjacent humidification flow channel runs.

10. The cooler-humidifier plate of claim 9, wherein each humidification flow channel run of the second major surface forms lands and wherein the lands separate adjacent humidification flow channel runs.

11. The cooler-humidifier plate of claim 10, wherein the width of each land is less than the width of each of the humidification flow channel runs.

12. The cooler-humidifier plate of claim 11, wherein the land between adjacent humidification channel runs forms at least one discontinuity permitting communication between adjacent humidification channel runs.

13. The cooler-humidifier plate of claim 1, wherein said at least one coolant flow channel and said at least one humidification flow channel are oriented to transfer humidification heat from coolant in said at least one coolant flow channel to gas flowing in said at least one humidification flow channel.

14. The cooler-humidification plate of claim 1, wherein said at least one coolant flow channel and said at least one humidification flow channel are generally non-parallel.

15. The cooler-humidification plate of claim 14, wherein said at least one coolant flow channel runs substantially perpendicular to said at least one humidification flow channel.

16. The fuel cell assembly non-porous cooler-humidifier plate of claim 1, wherein said plate comprises metal.

17. The cooler-humidifier plate of claim 16 wherein said metal comprises stainless steel.

18. A solid-polymer-electrolyte fuel cell assembly comprising at least one cooler-humidifier fuel cell module, each module comprising:
  a non-porous cooler-humidifier plate disposed between at least two fuel cells, wherein the cooler-humidifier plate comprises
    a first major surface forming a coolant flow channel,
    a second major surface forming a humidification flow channel, and
    wick means for humidifying a reactant gas flowing over the second major surface; and
  each fuel cell comprises an anode, a cathode, and an electrolyte.

19. The fuel cell assembly of claim 18, wherein said coolant flow channel and said humidification flow channel are oriented to transfer humidification heat from coolant in said coolant flow channel to gas flowing in said humidification flow channel.

20. A non-porous humidifier plate for an active area of a fuel cell assembly, said plate comprising:
  a major surface forming a humidification flow channel;
  means for introducing a reactant gas into the humidification flow channel;
  means for introducing water into the humidification flow channel;
  means for transporting water along the length of the humidification flow channel; and
  means for obtaining humidification heat for said humidification flow channel from coolant flowing in said fuel cell assembly.

21. The humidifier plate of claim 10, wherein the water transporting means comprises a wick.

22. The humidifier plate of claim 20, wherein said humidification heat is obtained from coolant flowing in a coolant channel on a second major surface of the humidifier plate.

23. The humidifier plate of claim 20, further comprising:
  means for supplying humidified reactant gas from an exit of said humidification flow channel to an entrance of a reactant gas channel in a fluid flow plate of the fuel cell assembly.

24. A substantially planar fuel cell cooler-humidifier plate comprising:
  a first major exterior plate surface comprising a plurality of ribs that form at least one humidification flow channel, each first major surface rib having at least one end;
  a second major exterior plate surface comprising a plurality of ribs that form at least one coolant flow channel, each second major surface rib having at least one end;
  wherein the location of the end of each first major surface rib in the plane of the cooler-humidifier plate substantially corresponds with the location of a portion of a second major surface rib in that plane, and
  wherein the location of the end of each second major surface rib in the plane of the cooler-humidifier plate substantially corresponds with the location of a portion of a first major surface rib.

25. The cooler-humidifier plate of claim 24, wherein said at least one coolant flow channel comprises a pair of serpentine coolant flow channels which emanate from a midsection of said second major surface and proceed in opposite directions.

26. The cooler-humidifier plate of claim 24, wherein said at least one coolant flow channel comprises a serpentine coolant flow channel.

27. The cooler-humidifier plate of claim 26, wherein said at least one humidification flow channel comprises a serpentine humidification flow channel, and wherein said serpentine humidification flow channel is substantially perpendicular to said serpentine coolant flow channel.

28. A fuel cell stack assembly comprising a plurality of plates comprising:
  at least one bipolar fuel cell plate forming a plurality of bipolar-plate ribs having rib ends;
  at least one monopolar fuel cell plate forming a plurality of monopolar-plate ribs having rib ends; and
  a non-porous cooler-humidifier fuel cell plate forming a plurality of coolant flow channel ribs having rib ends on one side and a plurality of humidification flow channel ribs having rib ends on another side;
  wherein locations of the rib ends formed by each plate within the stack assembly substantially correspond with locations of ribs on an immediately adjacent plate of said plurality of plates.

29. The fuel cell stack assembly of claim 28, wherein the cooler-humidifier fuel cell plate comprises:
  a first major exterior plate surface comprising a plurality of ribs that form at least one humidification flow channel, each first major surface rib having at least one end;
  a second major exterior plate surface comprising a plurality of ribs that form at least one coolant flow channel, each second major surface rib having at least one end;
  wherein the location of the end of each first major surface rib in a plane of the cooler-humidifier plate substantially corresponds with the location of a portion of a second major surface rib in that plane; and
  wherein the location of the end of each second major surface rib in the plane of the cooler-humidifier plate substantially corresponds with the location of a portion of a first major surface rib.

* * * * *

UNITED STATES PATENT AND TRADEMARK OFFICE
CERTIFICATE OF CORRECTION

PATENT NO. : 6,066,408
DATED : May 23, 2000
INVENTOR(S) : Vitale et al.

It is certified that error appears in the above-identified patent and that said Letters Patent is hereby corrected as shown below:

Claim 21, Col. 11, line 63, delete "10" and replace with --20--.

Signed and Sealed this

Twentieth Day of March, 2001

Attest:

NICHOLAS P. GODICI

Attesting Officer        Acting Director of the United States Patent and Trademark Office